United States Patent [19]

Titus

[11] Patent Number: 4,525,764
[45] Date of Patent: Jun. 25, 1985

[54] SYSTEM FOR DISCONNECTING AN ELECTRICAL POWER SOURCE FROM A LOAD

[76] Inventor: Charles H. Titus, 323 Echo Valley La., Newtown Square, Pa. 19073

[21] Appl. No.: 387,182

[22] Filed: Jun. 10, 1982

[51] Int. Cl.³ .............................................. H02H 3/16
[52] U.S. Cl. ........................................ 361/42; 361/48
[58] Field of Search ..................... 361/42, 47, 48, 49, 361/50

[56] References Cited

U.S. PATENT DOCUMENTS

| | | | |
|---|---|---|---|
| 2,535,064 | 12/1950 | Harrison | 361/48 |
| 3,771,020 | 11/1973 | Smith | 361/48 |
| 3,895,264 | 7/1975 | Kirilloff | 361/48 |
| 4,206,490 | 6/1980 | Parrier et al. | 361/42 |
| 4,242,712 | 12/1980 | Doll | 361/42 |

FOREIGN PATENT DOCUMENTS

| | | | |
|---|---|---|---|
| 559422 | 2/1944 | United Kingdom | 361/42 |
| 679789 | 9/1952 | United Kingdom | 361/49 |
| 805456 | 12/1958 | United Kingdom | 361/42 |
| 1007794 | 10/1965 | United Kingdom | 361/42 |

OTHER PUBLICATIONS

Elektrotechnische Zeitschrift-ETZ65, (1944), pp. 109–113, 4/1944.

Primary Examiner—Harry E. Moose, Jr.
Attorney, Agent, or Firm—Dann, Dorfman, Herrell and Skillman

[57] ABSTRACT

In accordance with the present invention, an electrical system is provided for disconnecting a power source from a load when a voltage potential in excess of a predetermined threshold is detected between a test point and a selected voltage reference point. Switch means is electrically connected intermediate the power source and the load for switchably connecting and disconnecting the power source with the load. Voltage-reference means provides predetermined reference voltage at the selected voltage reference point. Voltage-detection means is electrically connected with the test point and the selected voltage reference point for detecting when the voltage potential between the test point and the selected voltage reference point exceeds the predetermined threshold. Switch-actuator means responsive to the detection means is provided for actuating the switch means to disconnect the power source from the load when voltage potential in excess of the predetermined threshold is detected by the detection means.

33 Claims, 4 Drawing Figures

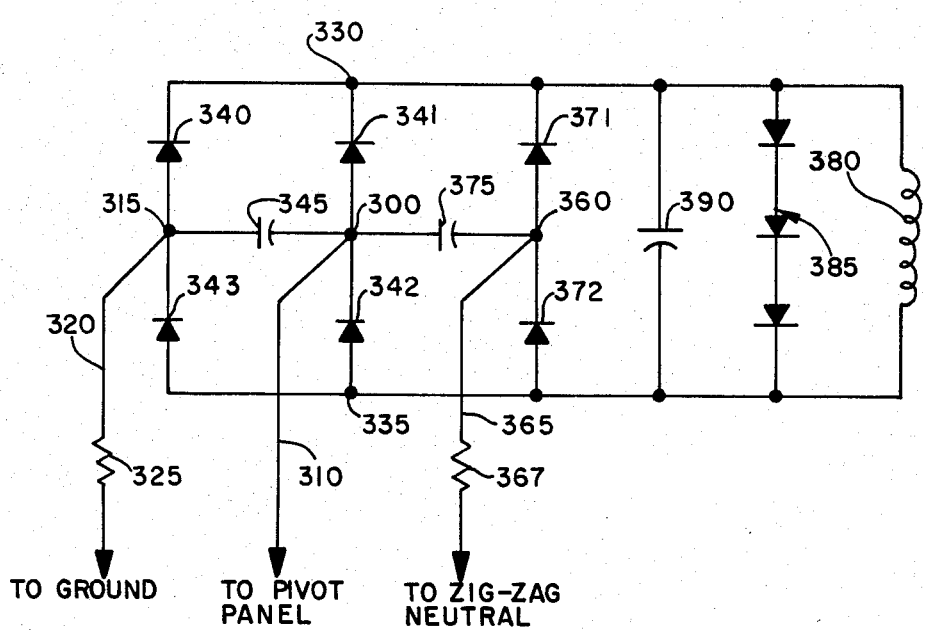
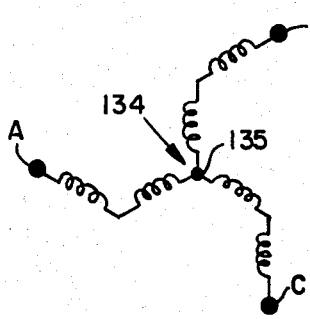
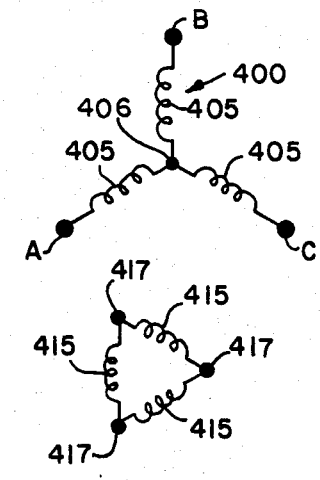
FIG. 2
FIG. 3

4,525,764

SYSTEM FOR DISCONNECTING AN ELECTRICAL POWER SOURCE FROM A LOAD

FIELD OF THE INVENTION

The present invention relates to an electrical system for disconnecting a power source from a load when a voltage potential in excess of a predetermined threshold is detected between a test point and a selected voltage reference point. More particularly, the present invention relates to a system for electrically disconnecting a multi-phase a.c. power source from a load, such as an electrically driven spinkler typically employed for farm irrigation.

BACKGROUND OF THE INVENTION

In utilizing high power electrical systems wherein a power source, such as a high voltage generator, is connected with a load, it is often desirable to detect the existence of abnormal voltage potentials at various test points on the system components or along the electrical circuitry connecting the components. Once an abnormal voltage is detected, it is also desirable to disconnect the power source typically causing the abnormal voltage potential from the system load. Furthermore, when an abnormally high voltage potential is inadvertently produced on a system component exposed to the public or system users, the possibility of electrocution requires that the power source causing the abnormal voltage be quickly disconnected from the system.

For the purpose of crop irrigation, electrically powered sprinkler systems are often employed on farms, and particularly the large western and mid-western farms, to irrigate large areas of crops in a timely and economical manner. To irrigate the fields, water is pumped from a well and fed to the sprinkler system where it is generally uniformly distributed onto the fields by large electrically driven sprinkler arms. The sprinkler arms typically extend radially from a pivot panel and are rotationally driven by a high voltage power source such as a 480/277 volt three-phase a.c. generator.

Under normal operating conditions, the sprinkler system is normally grounded to prevent lethal voltage potentials from inadvertently developing on the exposed metallic portions of the sprinkler system. However, if the system is improperly grounded or is simply inadequately grounded, lethal voltages may be produced on the otherwise normally grounded sprinkler system. For example, if the sprinkler system is grounded by utilizing a grounding rod inserted into the ground, conductivity between the grounding rod and the ground can be greatly reduced whenever the ground is dry. The reduction in conductivity can create undesirably high voltage potentials between the sprinkler system and the ground if the sprinkler system becomes inadvertently or unintentionally charged. For example, if one of the phase conductors is inadvertently connected to the frame of the sprinkler system, lethal voltages can be produced between the ground and the exposed metallic portions of the sprinkler system, such as the frame and sprinkler arms, thereby creating obvious danger to unwary users of the sprinkler system.

In accordance with the present invention, a system is provided for electrically disconnecting the power source, such as a multi-phase a.c. generator or alternator, from a load, such as a sprinkler system, when a voltage potential in excess of a predetermined threshold is detected between a test point, such as the normally grounded metallic frame of the sprinkler system, and a selected voltage reference point, such as the ground. When used in conjunction with the manually operated systems, the threshold voltage is selected at a level generally considered to be less than lethal voltage potentials. When the system detects a voltage in excess of the threshold voltage at a selected test point, the system will automatically function to disconnect the power source from the load. When a three-phase a.c. power source is utilized with a balanced load, the system will also detect an imbalance in phase voltage in excess of the selected threshold and will disconnect the power source from the load. In a specific application, the system of the present invention will effectively detect the existence of lethal voltage potentials on normally grounded components such as a sprinkler system and will function to quickly disconnect the power source from the load to avert the possibility of the electrocution of persons contacting the normally grounded component.

SUMMARY OF THE INVENTION

In accordance with the present invention, a system is provided for electrically disconnecting the power source from a load when a voltage potential in excess of a predetermined threshold is detected between a test point and a selected voltage reference point. Switch means is electrically connected intermediate the power source and the load for switchably connecting and disconnecting the power source with the load. Voltage-reference means is included for providing predetermined reference voltage at the selected voltage reference point. Voltage-detecting means is electrically connected with the test point and the selected voltage reference point for detecting when the voltage potential between the test point and the selected voltage reference point exceeds the predetermined threshold. Switch-actuator means responsive to the detection means is provided for actuating the switch means to disconnect the power source from the load when voltage potential in excess of the predetermined threshold is detected by the detection means.

BRIEF DESCRIPTION OF THE DRAWINGS

The foregoing summary, as well as the following description of the preferred embodiments of the present invention, will be better understood when read in conjunction with the appended drawings, in which:

FIG. 2 is a schematic diagram illustrating a variation in the electrical circuitry depicted in FIG. 1;

FIG. 3 is a schematic diagram illustrating the zig-zag transformer depicted in FIG. 1 and a wyedelta transformer which may be substituted for the zig-zag transformer in the circuitry depicted in in FIG. 1 to produce a neutral reference voltage.

DETAILED DESCRIPTION OF THE PREFERRED EMBODIMENTS

Figure 1:
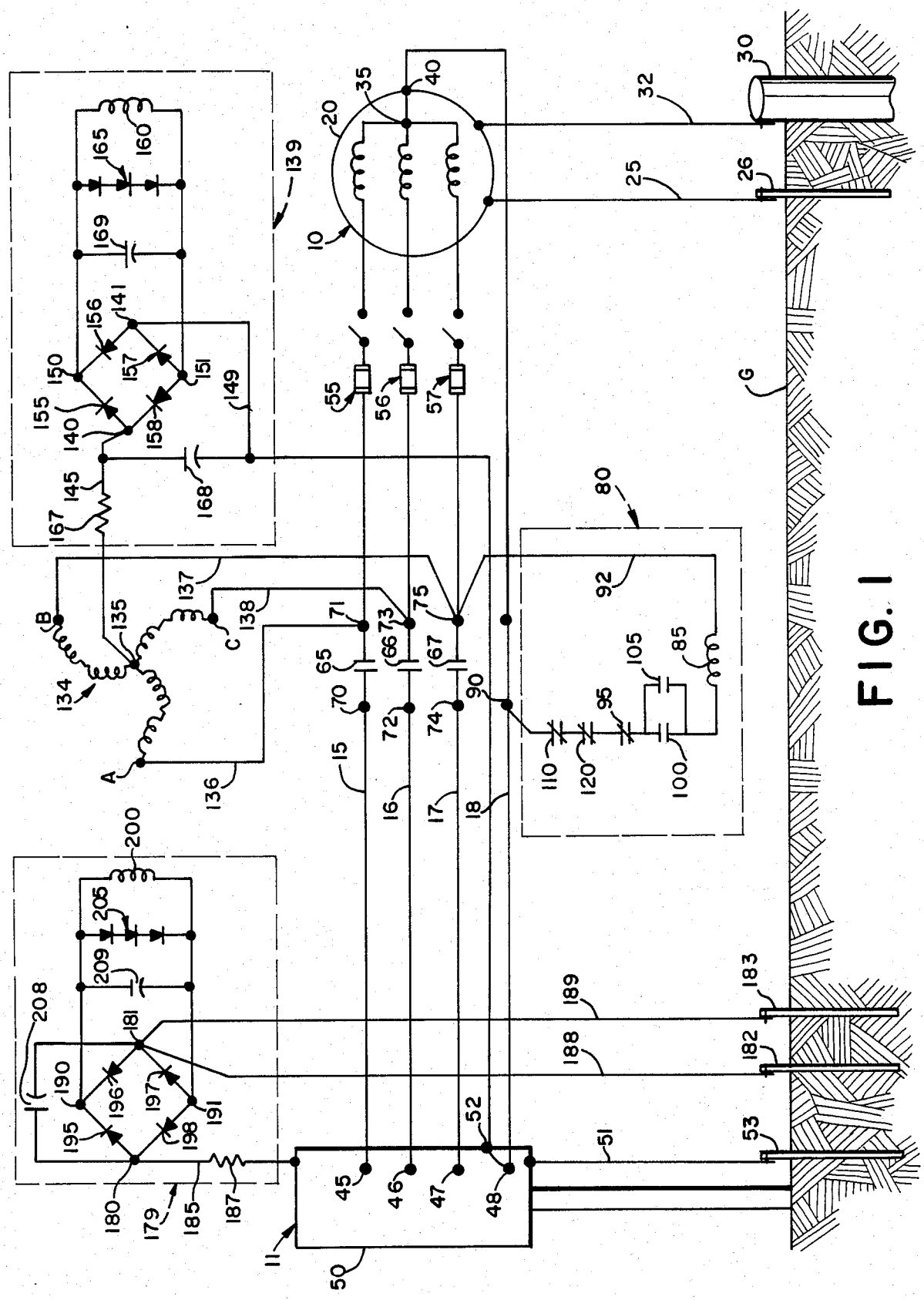
FIG. 1 is a schematic diagram illustrating the electrical circuitry of the system for disconnecting a power source from a load in accordance with the present invention.

Referring to FIG. 1, the electrical circuitry of the system for electrically disconnecting a power source from a load in accordance with the present invention is schematically depicted. The power source, generally designated 10, comprises a conventional three-phase a.c. power source such as a 480/277 volt three phase, four conductor, a.c. generator or alternator. Alternatively, a wye connected 480/277 volt distribution transformer of the type commonly used by electric utility companies may be used as a three-phase a.c. power source. The three-phase a.c. power source 10 is connected to a balanced load, generally designated 11, such as a pivot panel for the sprinkler arms of a conventional sprinkler system employed for farm irrigation. During crop irrigation, power supplied to the pivot panel 11 drives the sprinkler arms which distribute water onto the fields. The pivot panel 11 is connected with the three-phase a.c. power source 10, such as the a.c. generator, by means of phase conductors 15, 16 and 17 and neutral conductor 18.

The metal frame 20 of the three-phase power source is connected to ground G by means of a grounding wire 25 connected with ground rod 26 driven into the ground in the vicinity of the metallic casing 30 of the water well used to supply water to the irrigation sprinkler. The three-phase power source is typically driven by a gas engine (not illustrated) that is often simultaneously used to pump water from the well.

The metal frame 20 of the three-phase power source is also typically connected to the metallic casing 30 of the water well by means of ground wire 32 to ensure that the metal frame 20 is properly grounded. The neutral 35 of the a.c. generator, serving as the three-phase power source 10, is also typically grounded. For this purpose, the neutral conductor 18 leading from the neutral 35 of the three-phase power source can be conveniently connected to the grounded metallic frame 20 of the a.c. generator at terminal 40.

The three phase conductors 15, 16 and 17 of the a.c. generator are connected to the pivot panel 11 at terminals 45, 46 and 47, respectively. The neutral conductor 18 leading from the neutral of the a.c. generator is connected to the pivot panel at terminal 48 and is tied to the metallic frame 50 of the pivot panel at terminal 52. The frame 50 of the pivot panel is connected to ground by means of ground wire 51 connected to ground rod 53 inserted into the ground in the vicinity of the pivot panel 11. Although voltage is not normally supplied to the metallic frame 50 of the pivot panel, it is grounded as a safety precaution to prevent electrocution of personnel and system users if an undesirably high voltage potential should inadvertently be produced on or supplied to the frame. As an additional safety precaution, fused safety switches 55, 56 and 57 having a safety fuse and manually operated switch are respectively provided on each of the phase conductors 15, 16 and 17 intermediate the power source 10 and the load 11, preferably at positions proximate to the power source. The fused safety switches 55, 56 and 57 are normally left in the closed position unless personnel are working on the sprinkler system and, in such event, the switches may be opened to prevent the sprinkler system from being inadvertently energized.

To energize the sprinkler pivot panel 11, switch means is electrically connected intermediate the power source and the pivot panel in series with fused safety switches 55, 56 and 57. For this purpose, switchable contactor means is also provided on the phase conductors 15, 16 and 17 intermediate the three phase power source and the sprinkler pivot panel. The switchable contactor means comprises main contacts 65, 66 and 67 which are respectively connected in series with each of the phase conductors 15, 16 and 17, respectively. Main contact 65 is connected with phase conductor 15 at terminals 70 and 71. Main contact 66 is connected with phase conductor 16 at terminals 72 and 73. Main contact 67 is connected with phase conductor 17 at terminals 74 and 75. The main contacts have a closed position and open position and function as switch means for switchably connecting and disconnecting the three phase power source from the sprinkler pivot panel.

To close and open the main contacts 65, 66 and 67 in order to connect and disconnect the power source from the load, switch-actuator means, generally designated 80, is provided. For this purpose, contact-actuating circuitry is provided to open and close the main contacts 65, 66 and 67. A contact-actuating coil 85 is connected in series between terminal 75 on phase conductor 17 and terminal 90 on neutral conductor 18 by means of conductor 92. A normally closed OFF switch 95 is connected in series with contact actuating coil 85. A normally open ON switch 100 is connected in parallel with a switchable auxillary contact 105, and the parallel arrangement is connected with conductor 92 in series with the OFF switch 95 and the contact-actuating coil 85. Normally closed relay contact 110 and normally closed relay contact 120, the function of which will be described hereinafter, are also connected with conductor 92 in series with the OFF switch 95, the contact-actuating coil 85, and the parallel arrangement of the auxillary contact 105 and the ON switch 100.

To energize the sprinkler system, the normally open ON switch is closed so that contact-actuating coil 85 is energized by the power source. When the contact-actuating coil is initially energized, magnetic attraction of the solenoid armature closes main contacts 65, 66 and 67 and also closes auxillary contact 105. As soon as the auxillary contact 105 closes, the ON switch may be opened since the contact-actuating coil 85 will be "sealed in" by the closed auxillary contact 105 and the coil 85 will remain energized. When contact-actuating coil 85 is energized, main contacts 65, 66 and 67 will remain closed, thereby connecting the power source with the load, such as sprinkler system 11. The contact-actuating coil must be energized at all times when the sprinkler system is operating to close main contacts 65, 66 and 67.

The contact-actuating coil 85 will remain energized until power is removed from the coil by automatically opening the normally closed relay contact 110 and/or relay contact 120; by manually opening the normally closed OFF switch 95; by de-energizing the main power circuitry, for example, by shutting off the a.c. generator; and/or opening, breaking, or disconnecting the phase conductor 17 or by opening, breaking, or disconnecting the neutral conductor 18 between terminal 90 and terminal 35. Under normal operating conditions, the contact-actuating coil 85 is de-energized to shut down the sprinkler system at the end of an irrigation period by manually opening the normally closed OFF switch 95. When the contact-actuating coil is de-energized, the main contacts 65, 66 and 67 and the auxillary contact 105 will open thereby de-energizing the sprinkler system, and its associated pivot panel. The simultaneous opening of auxillary contact 105 will prevent the sprinkler system from being re-energized without manual actuation of the normally open ON switch.

When a three-phase 480/277 volt, four conductor, a.c. generator is employed as the power source and is connected with a balanced load such as the sprinkler pivot panel, each of the phase voltages will be balanced and essentially equal in magnitude. However, if one of the three phases becomes electrically connected to the system neutral, to ground, or to the grounded frame of the generator or the sprinkler itself, then the voltage from any or all of the phases will no longer be equal or balanced. Although an imbalance in phase voltage is not inherently dangerous by itself, if the imbalance results, for example, from a phase conductor being inadvertently connected to the metallic frame of the sprinkler pivot panel, such imbalance may be indicative of the existence of lethal voltage potentials being produced on the frame of the sprinkler system if the frame is improperly or inadequately grounded.

By detecting an imbalance in phase voltage to ground or to neutral, the main contacts can be opened to disconnect the power source from the load to avert an otherwise hazardous condition. Hence, to detect if and when an imbalance in the phase voltage exceeds a predetermined threshold level, voltage-detection means is employed to detect voltage potentials in excess of a selected threshold voltage and to initiate response in the switch-actuator means, generally designated 80, so as to open the switch means, such as main contacts 65, 66 and 67, to disconnect the power source from the load. Since it is generally accepted that power frequency voltages of less than 30 volts rms are not considered to be lethal, a threshold voltage of less than 30 volts is desirable in systems such as sprinkler systems, involving possible manual contact by system users or even by the public. However, if the threshold voltage is selected too low, for example, on the level of 10 to 15 volts rms, it is quite likely that unnecessary or nuisance shutdown of the system will occur. By selecting a threshold voltage on the order of 25 volts rms, nuisance shutdown of the system can be avoided while enabling safe shutdown when an imbalance in the phase voltage of magnitudes less than lethal voltage potentials is detected.

To detect an imbalance in phase voltages resulting, for example, when on of the three phase conductors becomes electrically connected to the system neutral, to ground, or to the grounded frame of the generator or the sprinkler itself, a zig-zag transformer 134 is employed having each of the its branch terminals A, B, and C, respectively, connected to each of the phase conductors 15, 17 and 16 at terminals 71, 75 and 73 by means of conductors 136, 137, and 138. The floating neutral 135 of the zig-zag transformer functions as a voltage test point to which the voltage at a voltage reference point, such as on the grounded frame 50 of pivot panel box 11 can be compared. During operation of the sprinkler system under balanced conditions, the neutral 135 of the zig-zag transformer will remain at a voltage potential which is generally equal to the voltage potential of the grounded neutral 35 of the a.c. generator and the grounded frame 50 of pivot panel box 11 to which grounded neutral 35 is connected. Although the voltage potential may differ by a few volts due to harmonics, the potential difference will be less than the selected threshold voltage of 25 volts rms.

To detect the voltage potential between the floating neutral 135 of the zig-zag transformer and the grounded frame 50 of pivot panel 11, voltage detection means such as voltage detection circuitry, generally designated 139, is employed and electrically connected between neutral 135 of the zig-zag transformer and the frame 50 of pivot panel box 11. For this purpose, the a.c. terminals 140 and 141 of a diode bridge are respectively connected between the floating neutral 135 and frame 50 of pivot panel 11. Terminal 140 of the diode bridge is connected with floating neutral 135 of the zig-zag transformer by means of conductor 145. Terminal 141 of the diode bridge is connected with frame 50 of the pivot panel box 11 at terminal 52 by means of conductor 149. The a.c. terminals 140 and 141 of the diode bridge are connected with the d.c. terminals 150 and 151 of the bridge, by conductors and intermediate diodes 155, 156, 157, and 158. Intermediate diodes 155 and 156 are connected to permit current flow from a.c. terminals 140 and 141, respectively, to d.c. terminal 150 and intermediate diodes 157 and 158 are connected to permit current flow from d.c. terminal 151 to a.c. terminals 141 and 140, respectively.

Relay coil 160 is connected across d.c. terminals 150 and 151 of the diode bridge. Relay coil 160 is coupled with relay contact 110 so that whenever relay coil 160 is energized, relay contact 110 will open causing contact-actuating coil 85 to de-energize and open main contacts 65, 66 and 67 to disconnect the power source from the load. The parameters of the relay having coil 160 and contact 110 should be selected so that whenever an imbalance in the phase voltage causes a voltage potential in excess of the selected threshold voltage, such as 25 volts rms, to appear between the floating neutral 135 of the zig-zag transformer and the frame 50 of pivot panel box 11, the relay coil 160 will cause the relay contact 110 to open thereby shutting down the sprinkler system.

To prevent damage to the relay coil 160 if and when a large voltage such as a 277 phase voltage appears across the a.c. terminals of the diode bridge, a string of clamping diodes 165 is connected in parallel with relay coil 160 across the d.c. terminals 150 and 151 of the diode bridge. In place of the string of clamping diodes 165, a Zener diode may be substituted in the circuitry to perform the same function.

To limit the amount of current flowing through the rectifiers 155, 156, 157 and 158 of the diode bridge and the string of clamping diodes 165, current limiting resistor 167 is connected by conductor 145 intermediate a.c. terminal 140 of the bridge and the floating neutral 135 of the zig-zag transformer. Furthermore, the protect the rectifiers and the associated circuitry from damage where large switching surge voltages or lightning impulse voltages may appear across the voltage detection circuit, capacitor 168 is connected across the a.c. terminals 140 and 141 of the bridge between conductor 145 and conductor 149. Similarly, capacitor 169 is connected across the d.c. terminals 150 and 151 of the bridge in parallel with the string of clamping diodes 165 and relay coil 160.

By selecting appropriate parameters for the components of the voltage-detection circuitry, generally designated 139, the voltage necessary to energize the relay coil 160 can be adjusted so that relay coil 160 will energize when the selected threshold voltage appears between the test point at the floating neutral 135 of the zig-zag transformer and the voltage reference point on the normally grounded frame 50 of pivot panel 11. Hence, when a voltage potential in excess of the selected threshold is detected between the neutral of the zig-zag transformer and the normally grounded frame 50 of pivot panel box 11, relay coil 160 will become energized thereby opening relay contact 110 to de-energize and shut down the sprinkler system. Under normal operation, the phase voltages will be balanced and voltages in excess of the selected threshold voltage will not be detected. However, in the event that a phase conductor comes in contact with "ground" or any portion of the sprinkler system which is normally electrically at zero potential, and the result in current flow is sufficient to unbalance the system voltage to such an extent that an rms voltage in excess of the selected threshold voltage is detected between the neutral of the zig-zag transformer and the grounded generator neutral or the grounded pivot panel to which the grounded generator netural is connected then the d.c. coil 160 will become energized.

Not only may it be desirable to detect an imbalance in phase voltage to initiate the disconnection of the power source from the load, but it may also be desirable to detect when a voltage potential in excess of the selective threshold voltage appears between the normally grounded frame 50 of the sprinkler system and "ground". For this purpose, second voltage detection means, such as voltage-detection circuitry, generally designated 179, is employed and connected between the frame 50 of the sprinkler system and ground. The voltage-detection circuitry 179 employed to detect voltage potential between the frame 50 and ground is similar in design and function to the voltage-detection circuitry 139 previously described.

The a.c. terminals 180 and 181 of a diode bridge are connected between the frame 50 of the sprinkler system and ground rods 182 and 183 inserted into the ground at a distance from ground rod 56 of the sprinkler system. The a.c. terminal 180 of the bridge is connected with the frame 50 of the sprinkler system by means of conductor 185 and a current limiting resistor 187. The other a.c. terminal 181 of the bridge is connected to ground rods 182 and 183 by means of grounding conductors 188 and 189, respectively. The a.c. terminals 180 and 181 are connected with the d.c. terminals 190 and 191 of the bridge by conductors and intermediate diodes 195, 196, 197 and 198. Diodes 195 and 196 are connected to permit current flow from the respective a.c. terminals 180 and 181 to d.c. terminal 190. Diodes 197 and 198, respectively, are connected to permit current flow from d.c. terminal 191 to a.c. terminals 181 and 180, respectively. Relay coil 200 is connected across the d.c. terminals 190 and 191 of the bridge and is coupled with relay contact 120 so that whenever relay coil 200 is energized, relay contact 120 will open thereby causing contact-actuating coil 85 to de-energize and open main contacts 65, 66 and 67.

To protect the voltage-detection circuitry 179, a circuit protecting capacitor 208 is connected across the a.c. terminals 180 and 181 of the diode bridge. Likewise, a string of clamping diodes 205 are connected in parallel with the relay coil 200 across the d.c. terminals of the bridge. Once again, the string of clamping diodes 205 may be replaced by a Zener diode which will perform the same function as the clamping diodes. Capacitor 209 is likewise connected across the d.c. terminals 190 and 191 of the bridge in parallel with the string of clamping diodes 205 and relay coil 200. The parameters of the relay having coil 200 and contact 120 are selected so that relay coil 200 will energize when voltage potentials in excess of the selected threshold voltage appear between the normally grounded frame 50 of the sprinkler system and the ground G at ground rods 182 and 183. When relay coil 200 is energized the sprinkler system will be disconnected from the power source causing a shutdown of the sprinkler system. For example, in the event that the neutral conductor 18 of the a.c. generator is broken or disconnected and/or the ground rod 53 used to ground the sprinkler system is driven into dry ground where the electrical resistance is so high that the sprinkler system is not effectively grounded, the voltage detecting circuitry generally designated 179 will quickly detect if a voltage in excess of a selected threshold voltage appears at the voltage test point on the normally grounded sprinkler system by comparison with the reference voltage at ground rods 182 and/or 183. If the threshold voltage is exceeded the sprinkler system will be quickly and automatically shut down as contacts 65, 66 and 67 are opened to disconnect the power source from the load.

The voltage detection circuits 139 and 179, the circuitry generally designated 80, and the zig-zag transformer 134 are preferably located in the physical vicinity of the sprinkler pivot panel 11. Referring to FIG. 2, an alternate embodiment of the voltage detection circuitry illustrated in FIG. 1 is illustrated wherein the separate voltage detection circuits generally designated 179 and 139 in FIG. 1 have been combined into a much simpler and less expensive circuit in which redundant circuit components have been eliminated. More specifically, as illustrated in FIG. 2, the pair of diode bridges previously described in reference to FIG. 1 have been combined such that both diode bridges include a separate unshared a.c. terminal and simultaneously share a.c. terminal 300 which is connected to the normally grounded frame of the sprinkler pivot panel by conductor 310. An unshared a.c. terminal 315 of one of the diode bridges is connected to "ground" at ground rods 182 and 183 illustrated in FIG. 1 by conductor 320 and current limiting resistor 325. The a.c. terminals 300 and 315 of the diode bridge are connected to shared d.c. terminals 330 and 335 by conductors and intermediate diodes 340, 341, 342 and 343. Diodes 340 and 341 are connected to permit current flow from a.c. terminals 315 and 300, respectively, to d.c. terminal 330. Diodes 342 and 343 are respectively connected to permit current flow from d.c. terminal 335 to a.c. terminals 300 and 315, respectively. A circuit protecting capacitor 345 is connected between the a.c. terminals 300 and 315 of the diode bridge.

The second diode bridge, as previously described, shares a.c. terminal 300 with the first diode bridge and also has a second unshared a.c. terminal 360 which is connected to the neutral 135 of the zig-zag transformer 134, illustrated in FIG. 1, by conductor 365 and current limiting resistor 367. The a.c. terminals 300 and 360 of the second diode bridge are connected to the d.c. terminals 330 and 335 of the bridge by conductors and intermediate diodes 341, 342, 371, and 372. Intermediate diodes 341 and 342 are shared with the first bridge and intermediate diodes 371 and 372 are separate from the first bridge. Diodes 341 and 371 are connected to respectively permit current flow from a.c. terminals 300 and 360 to d.c. terminal 300. Diodes 342 and 372 are respectively connected to permit current flow from d.c. terminal 335 to a.c. terminals 300 and 360, respectively.

Similar to the diode bridge previously described a circuit protecting capacitor 375 is connected across a.c. terminals 300 and 360. A relay coil 380 is connected across the shared d.c. terminals 330 and 335 of the diode bridges and is coupled with relay contact 110 illustrated in FIG. 1 so that whenever relay coil 380 is energized, relay contact 110 will open causing main contacts 65, 66 and 67 to also open and disconnect the power source from the load. The parameters of the relay having coil 380 and contact 110 are selected so that relay coil 380 will energize whenever a voltage in excess of a selected threshold voltage potential appears between the zig-zag neutral and the pivot panel or between the pivot panel and the ground. For circuit protection, a string of clamping diodes 385 or, alternatively, a suitable Zener diode, is connected in parallel with relay coil 380 across d.c. terminals 330 and 335. Likewise, capacitor 390 is connected across the d.c. terminals 330 and 335 of the diode bridges in parallel with the string of clamping diodes 385 and relay coil 380. The voltage detection circuitry illustrated in FIG. 2 is merely a simplification of the voltage protection circuits 139 and 179 illustrated in FIG. 1 and will function in substantially the same manner as such circuits 139 and 179.

Referring to FIG. 3, the zig-zag transformer 134 depicted in FIG. 1 is illustrated with a wye-delta transformer 400 which may be substituted for the zig-zag transformer in the circuitry illustrated in FIG. 1 to derive a suitable neutral for a voltage test point at which such voltage can be compared to a selected reference voltage. By disconnecting the zig-zag transformer 134 from the circuitry illustrated in FIG. 1 and by connecting the wye connected primary windings 405 at the appropriate terminals A, B, and C illustrated in FIG. 1, a neutral test point can be derived at the neutral terminal 406 of the wye connected primary windings. By connecting conductor 145, which as illustrated in FIG. 1 is connected to the neutral 135 of the zig-zag transformer 134, to the neutral 406 of the wye connected primary windings 405 of the wye-delta transformer 400, a suitable neutral will be provided for the purpose of voltage comparison by the voltage detection circuitry 139 illustrated in FIG. 1. The purpose of the secondary windings 415 of the wye delta transformer is to establish a relatively solid reference point at neutral 406 to which conductor 145 is connected. The delta connected secondary windings 415 may be either left floating relative to ground or preferably one of the terminals 417 of the delta connected windings may be connected to ground. Hence, a suitable neutral is provided by the wye-delta transformer 400 which functions in substantially the same manner as the neutral 135 of the zig-zag transformer 134 in the circuitry described and illustrated in FIG. 1. The selection of a zig-zag transformer or a wye-delta transformer is primarily one of economics and availability.

Figure 4:
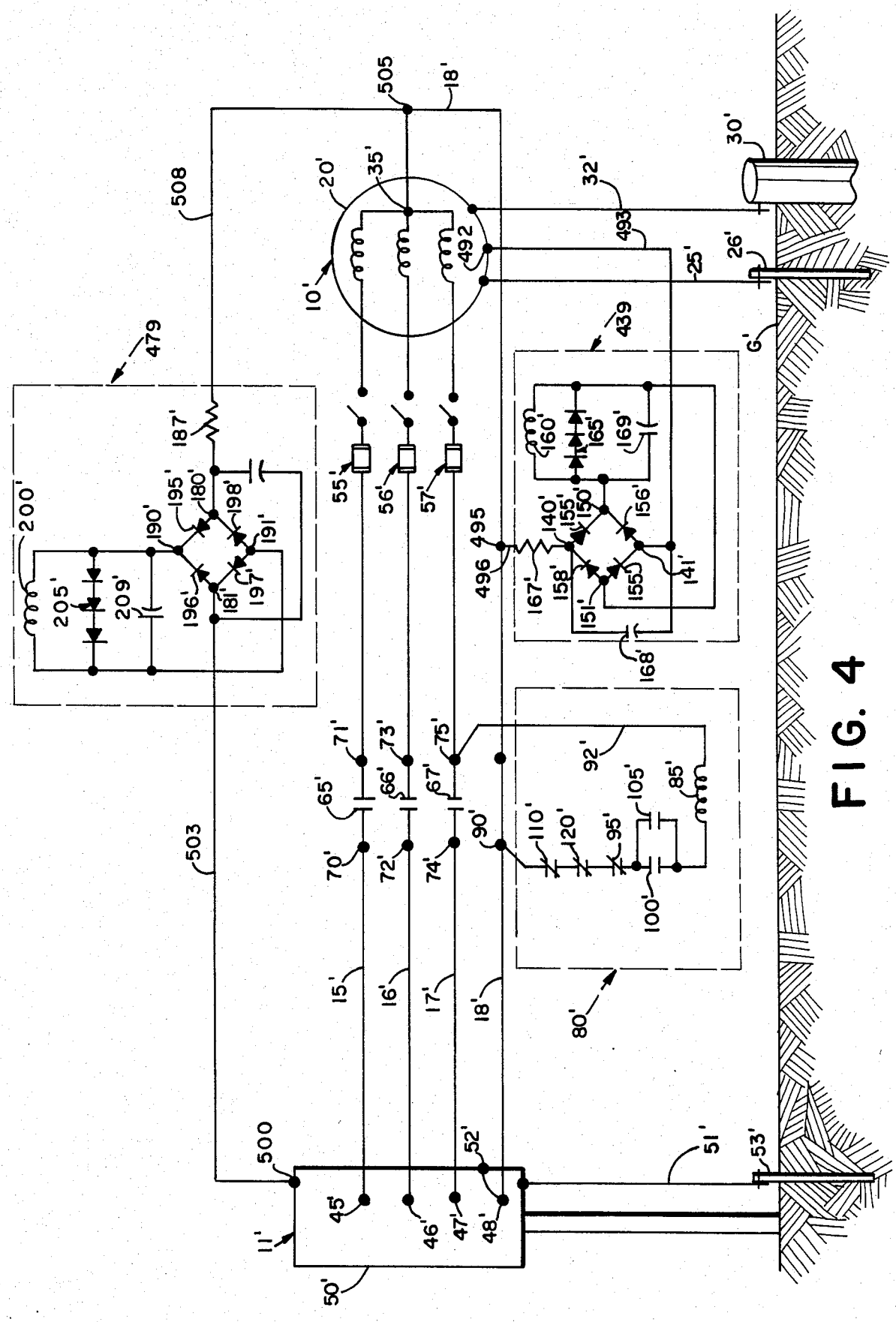
FIG. 4 is a schematic diagram illustrating the electrical circuitry of a system for disconnecting a power source from a load in accordance with another preferred embodiment of the present invention.

Referring to FIG. 4, another preferred embodiment of the electrical circuitry in accordance with the present invention is illustrated. Primed reference numerals are utilized in FIG. 4 to illustrate the same or substantially similar parts or components previously illustrated and described in connection with the embodiment illustrated in FIG. 1. The components illustrated by primed reference numerals function in substantially the same manner as the respective components previously described in connection with the circuitry illustrated in FIG. 1. The major difference between the embodiment previously described and illustrated in FIG. 1 and the embodiment illustrated in FIG. 4 is that the neutral conductor 18' of the a.c. generator 10' illustrated in FIG. 4 is no longer tied to the grounded frame 20' of the three phase power source. As a result, there is no need to derive a suitable neutral by means of a zig-zag transformer or a wye-delta transformer, since the a.c. generator provides the neutral 35' for voltage comparison.

Voltage detection circuitry, generally designated 439, is located near generator 10' and is generally similar in design to the voltage detection circuit 139 illustrated in FIG. 1 and includes a similar arrangement of circuit components as the circuit 139 depicted in FIG. 1. However, the values or parameters of the circuit components depicted in FIG. 4 may vary from those depicted in FIG. 1 since voltage detection circuit 439 is employed to detect voltage potential between different locations than voltage detection circuit 139.

Voltage detection circuit 439 is connected to the grounded frame of the a.c. generator 10' at terminal 492 by means of conductor 493 leading from the a.c. terminal 141' of the diode bridge. The other a.c. terminal 140' of the diode bridge is connected with the neutral conductor 18' of the a.c. generator at terminal 495 by means of conductor 496 and current limiting resistor 167'. Terminal 495 is preferably located in the physical vicinity of the neutral 35' of the a.c. generator. The components of circuit 439 are selected so that whenever a voltage in excess of a selected threshold voltage is detected between the test point on the neutral conductor at terminal 495 and the voltage reference point at terminal 492 on the grounded frame of the a.c. generator, relay coil 160' will energize to open relay contact 110' which, in turn, will de-energize contact actuating coil 85' causing main contacts 65', 66' and 67' to open and disconnect the a.c. generator 10' from the sprinkler system 11'. Contacts 65', 66' and 67' together with circuits 80' and 479 are preferably located in the physical vicinity of generator 10' in order to minimize the physical length of the conductors leading to contacts 110' and 120'.

To ensure the protection of system users and even the public, a second voltage detection circuit generally designated 479 is provided which is similar in design to the voltage detection circuit 179 previously described and illustrated in FIG. 1. The major difference between circuit 179 described and illustrated in reference to FIG. 1 and circuit 479 illustrated in FIG. 4 is that voltage detection circuit 479 is connected between the frame 50' of the sprinkler system 11' and the neutral conductor 18' of the a.c. generator. More particularly, the a.c. terminal 181' of the diode bridge is connected to the frame 50' of the sprinkler system at terminal 500 by means of conductor 503. The a.c. terminal 180' of the diode bridge is connected to the neutral conductor 18' at terminal 505 by means of conductor 508 and current limiting resistor 187'. Relay coil 200' is coupled with relay contact 120' and the parameters of the relay having relay coil 200' and relay contact 120' are selected so that whenever a voltage in excess of the selected threshold voltage appears between the test point at terminal 500 on the frame 50' of the sprinkler system and the voltage reference point at terminal 505 on neutral conductor 18' of the a.c. generator, coil 200' will become energized to open relay contact 120' thereby causing contact actuating coil 85 to de-energize thereby opening main contacts 65', 66' and 67' to disconnect the power source from the load. Therefore, if one or more of the phase lines are electrically connected with ground, the sprinkler, or the system neutral, one or the other or both of the voltage detecting circuits will detect a voltage in excess of the selected threshold voltage and will function to disconnect the power source from the load. For example, if neutral conductor 18' becomes disconnected from the pivot panel at terminal 48' and one of the phase conductors is then inadvertently connected to the pivot panel and the pivot panel becomes inadvertently charged to an undesirably high or a lethal voltage potential, if, for example, the frame of the pivot panel is inadequately or improperly grounded, voltage detection circuit, 479 will detect the voltage potential on the frame 50' by comparison with reference voltage at the neutral 35' of the a.c. generator and will function to shut down the system, if the selected threshold voltage is exceeded. Likewise, if frame 50' becomes charged to an undesirably high voltage potential in excess of the selected threshold voltage, voltage detection circuit 439 will also detect the voltage potential by comparison to the reference voltage on the grounded frame of the a.c. generator and will function to shut the system down.

If protection reduncancy is desired in the embodiment illustrated in FIG. 4 without utilizing voltage detection circuit 479 and conductors 503 and 508, the circuit 80 and the voltage detection circuits 179 and 139, including zig-zag transformer 134, illustrated in FIG. 1 can be employed by connecting the circuits 80, 179, and 139, and zig-zag transformer 134 to the embodiment illustrated in FIG. 4 in the general vicinity of pivot panel 11' in the same manner as was previously depicted and described in reference to FIG. 1. It is also possible to utilize only one of the circuits 179 and 139, including the zig-zag transformer 134, and not necessarily both. Circuit 80 and contacts 65, 66, and 67 will be connected proximate to the pivot panel 11 illustrated in FIG. 4, so that a dual set of contacts and their associated actuating circuits 80 and 80' will be employed. Voltage detection circuits 179 and 139, including zig-zag transformer 134, will be connected proximate to the pivot panel 11'. Circuit 179 will be connected by utilizing conductors 185, 188 and 189 and ground rods 182 and 183 as illustrated in FIG. 1. Circuit 139 and zig-zag transformer 134 will be connected by utilizing conductors 136, 137, 138 and 149 as illustrated in FIG. 1. For this arrangement, it is also desirable to connect the circuits 80' and 439 and contacts 65', 66', 67' depicted in FIG. 4, in the general vicinity of the generator 10'.

As set forth in the foregoing disclosure, an economical system for detecting voltage potentials in excess of a selected threshold is provided which functions to disconnect a power source from a load. However, while certain preferred embodiments of the present invention have been illustrated and described, it is to be understood that certain variations and modifications may be made by a person skilled in the art within the scope of the following claims.

What is claimed is:

1. A system for electrically disconnecting a power source from a load when a voltage potential in excess of a predetermined threshold is detected between a test point and a selected voltage reference point, comprising:
   (a) switch means electrically connected intermediate the power source and the load for switchably connecting and disconnecting the power source with the load, said switch means including at least one main contact connected between the power source and the load, the main contact being actuatable between a closed position to connect the power source with the load and an open position to disconnect the power source from the load;
   (b) voltage-reference means for providing reference voltage at the selected voltage reference point;
   (c) voltage-detection means electrically connected with the test point and the selected voltage reference point for detecting when the voltage potential between the test point and the selected voltage reference point exceeds the predetermined threshold, said voltage-detection means including a first relay coil and a rectifier bridge having a.c. input terminals connected with the voltage reference point and the voltage test point and d.c. output terminals connected with the first relay coil to produce a change in energy state of the first relay coil when a voltage potential in excess of the predetermined threshold is detected between the test point and the reference point; and
   (d) switch-actuator means for actuating the switch means to disconnect the power source from the load when a voltage potential in excess of the predetermined threshold is detected by the voltage-detection means, the switch-actuator means including a first relay contact coupled with the first relay coil to form a first relay, the first relay contact being actuatable between an open and a closed position in response to the change in energy state of the first relay coil, and a second contact-actuating coil coupled with the main contact to form a second relay, the second contact-actuating coil of the second relay being connected in series with said first relay contact to produce a change in energy state in the second contact-actuating coil to switch the main contact between the closed and open positions in response to actuation of the first relay contact between open and closed positions.

2. A system in accordance with claim 1 wherein said first relay coil energizes to cause the first relay contact to switch from the closed position to the open position which causes the second contact-actuating coil to de-energize opening the main contact to disconnect the power source from the load, when voltage potential in excess of the predetermined threshold is detected between the test point and the reference point.

3. A system in accordance with claims 1 or 2 wherein said load comprises a metallic frame and said test point is provided on said frame and wherein further said selected voltage reference point is provided at ground.

4. A system in accordance with claim 1 wherein the voltage-detection means further comprises a capacitor connected across the a.c. input terminals of the rectifier bridge.

5. A system in accordance with claim 1 wherein the voltage-detection means further comprises a resistor connected to one of the a.c. input terminals of the rectifier bridge in series with the test point and the reference point.

6. A system in accordance with claim 1 wherein the voltage-detection means further comprises a capacitor connected across the d.c. output terminals of the rectifier bridge.

7. A system in accordance with claim 1 wherein the voltage-detection means further comprises rectifier means connected across the d.c. output terminals of the rectifier bridge.

8. A system for electrically disconnecting a multiphase a.c. power source from a load when a voltage potential in excess of a predetermined threshold is detected between a test point and selected voltage reference point, comprising:

(a) switch means electrically connected intermediate the multi-phase power source and the load for switchably connecting and disconnecting the power source with the load, said switch means including a separate main contact connected between the power source and the load for each phase of the power source, each main contact being actuatable between a closed position to connect the power source with the load and an open position to disconnect the power source from the load;

(b) voltage-reference means for providing reference voltage at a selected voltage reference point;

(c) voltage-detection means electrically connected with the test point and the selected voltage reference point for detecting when voltage potential between the test point and the selected voltage reference point exceeds the predetermined threshold, said voltage-detection means including a first relay coil and a rectifier bridge having a.c. input terminals connected with the voltage reference point and the voltage test point and d.c. output terminals connected with the first relay coil to produce a change in energy state of the first relay coil when a voltage potential in excess of the predetermined threshold is detected between the test point and the reference point; and (d) switch-actuator means for actuating the switch means to disconnect the power source from the load when voltage potential in excess of the predetermined threshold is detected by the detection means, the switch-actuator means including a first relay contact coupled with the first relay coil to form a first relay, the first relay contact being actuatable between an open and a closed position in response to the change in energy state of the first relay coil and a second contact-actuating coil coupled with each of the main contacts to form a second relay, the second contact-actuating coil of the second relay being connected in series with said first relay contact of the first relay across a source of power to produce a change in energy state in the second contact-actuating coil to actuate each of the main contacts between the closed and open positions in response to actuation of the first relay contact of the first relay between open and closed positions.

9. A system in accordance with claim 8 wherein said first relay coil energizes to cause the first relay contact to switch from the closed position to the open position which causes the second contact-actuating coil to de-energize opening each main contact to disconnect the power source from the load, when voltage potential in excess of the predetermined threshold is detected between the test point and the reference point.

10. A system in accordance with claims 8 or 9 wherein said load comprises a metallic frame and said test point is provided on said frame and wherein said voltage reference point is provided at ground.

11. A system in accordance with claims 8 or 9 wherein said multi-phase a.c. power source comprises a three-phase a.c. power source and wherein said load comprises a generally balanced load and wherein said power source is electrically connected with said load by three phase conductors and wherein further said system comprises a zig-zag transformer connected with the three-phase conductors and wherein said test point is provided at the neutral of the zig-zag transformer.

12. A system in accordance with claim 11 wherein said power source includes a neutral conductor connected with ground and said voltage reference point is provided at the grounded neutral conductor of the power source.

13. A system in accordance with claim 11 wherein the load comprises a metallic frame and said voltage reference point is provided on said frame.

14. A system in accordance with claims 8 or 9 wherein said multi-phase power source comprises a three-phase power source and wherein said load comprises a generally balanced three-phase load and wherein said power source is connected with said load by three phase conductors and wherein further said system comprises a wye-delta transformer having wye connected primary windings connected with the three-phase conductors and delta connnected secondary windings and wherein said test point is provided at the neutral of the wye connected primary windings.

15. A system in accordance with claim 14 wherein said power source includes a neutral conductor connected with ground and said voltage reference point is provided at the grounded neutral conductor of the power source.

16. A system in accordance with claim 14 wherein the load comprises a metallic frame and said voltage reference point is provided on said frame.

17. A system in accordance with claims 8 or 9 wherein said load comprises a metallic frame and said test point is provided on said frame and wherein further said multi-phase a.c. power source includes a neutral conductor and said selected voltage reference point is provided on the neutral conductor of the multi-phase a.c. power source.

18. A system in accordance with claims 8 or 9 wherein said multi-phase a.c. power source includes a neutral conductor and said test point is provided on the neutral conductor of said multi-phase a.c. power source and said selected voltage reference point is provided at ground.

19. A system in accordance with claims 8 or 9 wherein said multi-phase a.c. power source comprises a metallic frame electrically connected to ground and an ungrounded neutral conductor and said selected voltage reference point is provided on the grounded frame of said a.c. power source and wherein further said test point is provided on the neutral conductor of the a.c. power source.

20. A system in accordance with claim 8 wherein the voltage-detection means further comprises a capacitor connected across the a.c. input terminals of the rectifier bridge.

21. A system in accordance with claim 8 wherein the voltage-detection means further comprises a resistor connected to one of the a.c. input terminals of the rectifier bridge in series with the test point and the reference point.

22. A system in accordance with claim 8 wherein the voltage-detection means further comprises a capacitor connected across the d.c. output terminals of the rectifier bridge.

23. A system in accordance with claim 8 wherein the voltage-detection means further comprises a rectifier means connected across the d.c. output terminals of the rectifier bridge.

24. A system for electrically disconnecting a multi-phase a.c. power source from a load when a voltage potential in excess of a predetermined threshold is detected between a test point and selected voltage reference point, comprising:
- (a) switch means electrically connected intermediate the multi-phase power source and the load for switchably connecting and disconnecting the power source with the load;
- (b) voltage-reference means for providing reference voltage at a selected voltage reference point;
- (c) voltage-detection means electrically connected with the test point and the selected voltage reference point for detecting when voltage potential between the test point and the selected voltage reference point exceeds the predetermined threshold, said voltage-detection means including a relay coil and a rectifier bridge having a.c. input terminals connected with the voltage reference point and the voltage test point and d.c. output terminals connected with the relay coil to produce a change in energy state of the relay coil when a voltage potential in excess of the predetermined threshold is detected between the test point and the reference point;
- (d) switch-actuator means responsive to the change in energy state of the relay coil for actuating the switch means to disconnect the power source from the load when voltage potential in excess of the predetermined threshold is detected by the detection means;
- (e) second voltage reference means for providing second predetermined reference voltage at a second selected voltage reference point; and
- (f) second voltage-detection means electrically connected with a second test point and the second selected voltage reference point for detecting when the voltage potential between the second test point and the second selected voltage reference point exceeds the predetermined threshold, said second voltage-detection means including a second relay coil and a second rectifier bridge having a.c. input terminals connected with the second voltage reference point and the second voltage test point, and d.c. output terminals connnected with the second relay coil to produce a change in energy state of the second relay coil when a voltage potential in excess of the predetermined threshold is detected between the second test point and the second reference point;

and wherein said switch-actuator means is responsive to the change in energy state of the second relay coil for actuating the switch means to disconnect the power source from the load when a voltage potential in excess of the predetermined threshold is detected by the second detection means.

25. A system in accordance with claim 24 wherein said load comprises a metallic frame and said first mentioned test point is provided on said first mentioned frame and wherein said voltage reference point is provided at ground.

26. A system in accordance with claim 24 or 25 wherein said multi-phase a.c. power source comprises a three-phase a.c. power source and wherein said load comprises a generally balanced load and wherein said power source is electrically connected with said load by three phase conductors and wherein further said system comprises a zig-zag transformer connected with the three-phase conductors and wherein said second test point is provided at the neutral of the zig-zag transformer.

27. A system in accordance with claim 26 wherein said power source includes a neutral conductor connected with ground and said second voltage reference point is provided at the grounded neutral conductor of the power source.

28. A system in accordance with claims 24 or 25 wherein said multi-phase power source comprises a three-phase power source and wherein said load comprises a generally balanced three-phase load and wherein said power source is connected with said load by three phase conductors and wherein further said system comprises a wye-delta transformer having wye connected primary windings connected with the three-phase conductors and delta connected secondary windings and wherein said second test point is provided at the neutral of the wye connected primary windings.

29. A system in accordance with claim 28 wherein said power source includes a neutral conductor connected with ground and said second voltage reference point is provided at the grounded neutral conductor of the power source.

30. A system in accordance with claim 24 wherein said load comprises a metallic frame and said first mentioned test point is provided on said first mentioned frame and wherein further said multi-phase a.c. power source includes a neutral conductor and said selected voltage reference point is provided on the neutral conductor of the multi-phase a.c. power source.

31. A system in accordance with claim 24 wherein said multi-phase a.c. power source includes a neutral conductor and said second test point is provided on the neutral conductor of said multi-phase a.c. power source and said second selected voltage reference point is provided at ground.

32. A system in accordance with claim 30 wherein said second test point is provided on the neutral conductor of said multi-phase a.c. power source and said second selected voltage reference point is provided at ground.

33. A system in accordance with claim 31 wherein said multi-phase a.c. power source comprises a metallic frame electrically connected to ground and an ungrounded neutral conductor and said second selected voltage reference point is provided on the grounded frame of said a.c. power source and wherein further said second test point is provided on the neutral conductor of the a.c. power source.

* * * * *